United States Patent [19]

Bauer et al.

[11] Patent Number: 5,271,429
[45] Date of Patent: Dec. 21, 1993

[54] INTERNAL COMBUSTION ENGINE LUBRICATING OIL FILTER VALVE

[75] Inventors: Sascha Bauer, Auenwald; Heinz Habiger; Klaus Mack, both of Ludwigsburg; Jaroslay Pavlin, Freiberg, all of Fed. Rep. of Germany

[73] Assignee: Filterwerk Mann & Hummel GmbH, Ludwigsburg, Fed. Rep. of Germany

[21] Appl. No.: 945,410

[22] Filed: Oct. 6, 1992

Related U.S. Application Data

[62] Division of Ser. No. 718,418, Jun. 24, 1991, Pat. No. 5,193,579.

[30] Foreign Application Priority Data

Jun. 23, 1990 [DE] Fed. Rep. of Germany ... 9007022[U]
Jul. 11, 1990 [DE] Fed. Rep. of Germany ... 9010459[U]
Jan. 9, 1991 [DE] Fed. Rep. of Germany ... 9100194[U]

[51] Int. Cl.⁵ .............................................. F16K 15/06
[52] U.S. Cl. .................................................. 137/543.23
[58] Field of Search ................... 137/540, 543, 543.19, 137/543.23, 543.21

[56] References Cited

U.S. PATENT DOCUMENTS

| | | | |
|---|---|---|---|
| 1,890,223 | 12/1932 | Kilzer | 137/543 X |
| 2,904,065 | 9/1959 | Butlin | 137/454.4 |
| 2,918,083 | 12/1959 | Clark | 137/543.21 X |
| 3,457,949 | 7/1969 | Coulter | 137/543.21 |
| 3,657,893 | 4/1972 | Tadokoro | 137/540 X |
| 3,913,615 | 10/1975 | Cooper | 137/543.19 |
| 4,228,820 | 10/1980 | Deminski | 137/514.3 |
| 4,815,493 | 3/1989 | Miller | 137/543.19 X |

FOREIGN PATENT DOCUMENTS

| | | |
|---|---|---|
| 309137 | 3/1989 | European Pat. Off. |
| 730002 | 1/1943 | Fed. Rep. of Germany |
| 655560 | 7/1951 | United Kingdom |

Primary Examiner—Robert G. Nilson
Attorney, Agent, or Firm—Evenson, McKeown, Edwards & Lenahan

[57] ABSTRACT

A valve, particularly a pressure relief valve for the lubricating oil filter of an internal combustion engine, which includes a valve plate 11, a valve body 10 cooperating with the valve plate, a valve spring 14 and a valve hood 15, the valve spring 14 being supported on the valve hood 15 and exerting a force on the valve plate to seal the opening between the valve plate and the valve body. A cylindrical guide 24 is provided at the upper end of the valve hood, and the valve plate 11 contains a blind bore 25 which receives the cylindrical guide in order to guide the valve plate.

5 Claims, 3 Drawing Sheets

С5,271,429

INTERNAL COMBUSTION ENGINE LUBRICATING OIL FILTER VALVE

This application is a division of copending application Ser. No. 07/718,418, filed Jun. 24, 1991, now U.S. Pat. No. 5,193,579.

BACKGROUND OF THE INVENTION

This invention relates to a valve, particularly a pressure relief valve for a lubricating oil filter of an internal combustion engine, which valve comprises a valve plate, a valve body which cooperates with the valve plate, a valve spring, and a valve hood, in which the valve spring is supported on the valve hood and exerts a force against the valve plate to seal the opening between the valve plate and the valve body, and in which the valve body has a bead margin at the end facing the valve seat and the valve hood is crimped under this bead margin.

German utility model no. DE-G 18 95 630 discloses a fluid filter for a motor vehicle hydraulic system which has an overflow valve. This valve consists of a valve plate for which a valve seat disk is provided, which is joined to a housing by crimping. An open-sided valve hood is attached to this valve seat disk, and a valve spring acting on the valve plate is supported on this valve hood.

Such valves generally serve to maintain oil circulation when the oil filter is too heavily clogged and in need of replacement, at which time the valve opens at a certain oil pressure which occurs under such conditions. The valve described in this German utility model is completely crimped onto the housing of the filter, so that if the valve becomes defective or when maintenance operations are necessary the valve cannot be replaced. Furthermore, the valve seat is formed by the valve plate on the one hand and a valve seat disk on the other, which is a crimped piece of sheet metal. In this kind of construction there is a danger that, if the valve seat disk is not completely flat, the valve will be leaky even in normal operation, so that dirty lubricating oil can reach the clean oil side of the filter.

German utility model no. DE-G 90 10 459 discloses a valve which avoids the above-described disadvantages and assures a reliable sealing of the clean oil side from the dirty oil side. In this valve, however, it is necessary to have a crimped-on valve hood which is designed to support the valve spring and to guide the valve plate.

SUMMARY OF THE INVENTION

It is therefore the object of the invention to provide a valve which avoids the aforementioned disadvantages.

It is also an object of the invention to provide a valve which assures reliable sealing.

Another object of the invention is to provide a valve which consists of only a few component parts and is inexpensive to manufacture.

A further object of the invention is to provide a valve which is easily replaceable.

These and other objects of the invention are achieved according to a first aspect of the invention by providing a valve comprising a valve body having a valve opening therethrough and a valve plate having a valve seat thereon which cooperates with the valve body to close the valve opening, a valve hood secured to the valve body enclosing the valve plate, and a valve spring supported against the valve hood for urging the valve plate toward the valve body to seal the valve opening; in which the valve body is a cylindrical body having at one end facing the valve seat a bead margin under which the valve hood is crimped to secure it to the valve body; in which the valve hood has a circumferential flange which is crimped under the valve body bead margin to secure the valve hood to the valve body, a plurality of openings above the flange distributed around the circumference of the valve hood through which a fluid flowing through the valve can pass, and a cylindrical valve plate guide at the upper end of the hood; and in which the valve plate is formed with a blind guide bore at one end facing the cylindrical valve plate guide for receiving the cylindrical guide in order to guide the valve plate.

According to a further aspect of the invention, the objects are achieved by providing a valve comprising a valve plate having a valve seat arranged thereon, a valve body having a valve opening therethrough and a valve seat surface arranged thereon for cooperation with the valve seat of the valve plate, an end plate secured to an end of the valve plate opposite the valve seat, and a valve spring supported between the valve body and the end plate and exerting a force on the valve plate to urge the valve seat on the valve plate into contact with the valve seat surface on the valve body and seal the valve opening, in which the valve plate is provided with a plurality of guide members which extend axially through the valve opening in the valve body for guiding the valve plate; and in which the end plate is secured to the valve plate by means of an interlocking projection provided on the end of the guide plate opposite the valve seat.

In yet another aspect of the invention the objects are achieved by providing a valve comprising a cylindrical valve body having an a valve opening therethrough, a valve plate having a valve seat thereon cooperating with the valve body to close the valve opening, a valve hood secured to the valve body enclosing the valve plate, and a spring disposed between the valve hood and the valve plate for urging the valve plate against the valve body to seal the valve opening; in which the valve body has at an end facing the valve seat a bead margin under which a flange on the valve hood is crimped to secure the valve hood to the valve body; in which the valve seat comprises a frustoconical surface which contacts a corresponding frustoconical surface of a central bore which defines the valve opening in the valve body; and in which a screw thread is arranged circumferentially around the cylindrical valve body for securing the valve body in a fluid passageway.

An important advantage of the invention is the provision of a valve for bypassing the dirty oil filter, which has a valve hood provided with a continuous crimped edge. This has the advantage that the valve hood is crimped onto the entire circumference of the valve body and thus prevents distortion of the valve body by irregular bead surfaces, even when the valve body is pressed into a mating socket. Since the valve body is a massive cylindrical part, the valve seat is better able to resist deformation, so that reliable sealing is assured.

Particularly in the case of a non-return valve or check valve, any loss through leakage of the valve is unacceptable. Such non-return valves are used to prevent the oil filter from emptying when the engine is stopped, so that, when the motor is restarted, the oil pressure in the entire system can build up very quickly.

Another advantage of the invention is that the valve plate is guided by the valve hood. Thus any tilting of the valve plate or any offset from the sealing surface is effectively prevented.

According to one embodiment of the invention the valve seat is provided with a conical surface on the valve body, while the area of the valve plate cooperating with this conical surface has a slightly rounded surface. This combination of surfaces at the valve seat assures good sealing.

It is especially advantageous if the components of the valve are made of different materials. The valve body consists of aluminum or an aluminum alloy. This has the advantage that the valve hood, which consists for example of an injection-molded plastic part, can be crimped onto the valve body in a simple and reliable manner.

The valve plate is likewise preferably an injection-molded part. A plastic part furthermore improves the reliability of the seal between the valve body and the valve plate. Moreover, complex valve plate shapes can easily be manufactured in an injection-molded plastic part.

In a further improvement, the valve body is provided on its outer circumference with a screw thread or with a groove for the insertion of an O-ring. Mounting the valve body with a screw thread or with an O-ring seal allows for easy replacement of the valve, for example, during maintenance operations.

Another possibility is for the valve body to be force-fitted into the valve socket. This is desirable where replacement of the valve is not anticipated, and the installation of a valve must be inexpensive to perform. For force-fitting a valve of this kind it has also been found desirable to slightly taper the mating surfaces of the valve and/or socket (taper angle approximately 4-5°).

According to a further preferred embodiment of the invention, a valve, especially for the pressure lubricating oil filter of an internal combustion engine, is provided which requires no valve hood and which can be installed without any material deformation.

This solution is distinguished by the fact that the valve plate is guided by the valve body itself, so that additional guide means are not needed.

According to a further development of the invention, the end plate is attached to the valve plate by a snap fastener. Such a snap fastener may take the form of a bayonet lock. It has been found advantageous, for example, to provide the end of the valve plate guiding surfaces with a T-shaped projection. The end plate is equipped with a slot running through its center. When the end plate and valve plate are assembled, the T-shaped projection is extended through the slot, and by a 90° rotation of the end plate the latter is brought into the engaged position and secured against axial or radial displacement.

The end plate is advantageously provided with a plurality of openings. This has the advantage of reducing resistance to flow when the valve is opened.

According to an additional advantageous embodiment, the valve body is made of aluminum. It can be fastened in a bore of a pressure lubrication filter, for example, by means of a force fit or a threaded connection. The valve plate and the end plate preferably are formed of injection-molded plastic.

According to another preferred embodiment a valve for bypassing the lubricating oil filter is provided which is configured as a threaded component so that it can be replaced during maintenance operations on the one hand, and it is possible to install different valves to provide different opening pressures on the other hand. Since the valve body is essentially a massive cylindrical part, the valve seat will also provide better resistance to deformation to assure reliable sealing.

Instead of a threaded mounting connection, the valve body may alternatively be provided with a bayonet lock or a smooth outer surface with an O-ring. In this case, the valve may be held in position by a snap ring. All of the aforementioned mounting methods enable the valve to be replaced by simple means.

In a further development of the invention the valve body is provided with a slot, for example, which enables the valve to be installed or removed with a screwdriver.

It is of particular advantage if the valve parts are made of different materials. The valve body, for example, may be made of aluminum or an aluminum alloy. This has the advantage that the valve hood, which is made, for example, from sheet steel treated to resist corrosion, can be crimped onto the valve body in a simple and reliable manner.

The valve plate is advantageously injection-molded from plastic material. Use of a plastic part for the valve plate in conjunction with the valve body of aluminum helps to assure a reliable seal.

In a further development of the invention, guide surfaces are provided on the valve plate for securely guiding the valve plate in the valve body. The guide surfaces may, for example, be star-shaped and serve to center the valve plate with respect to the wall of the bore in the valve body.

The valve hood may advantageously be made from a strip of sheet metal in a form which can securely retain the valve spring and yet contains lateral openings large enough to permit oil to flow through them without restriction when the valve is opened.

BRIEF DESCRIPTION OF THE DRAWINGS

The invention will be described in further detail with reference to representative embodiments illustrated in the accompanying drawings in which.

DETAILED DESCRIPTION OF PREFERRED EMBODIMENTS

Figure 1:
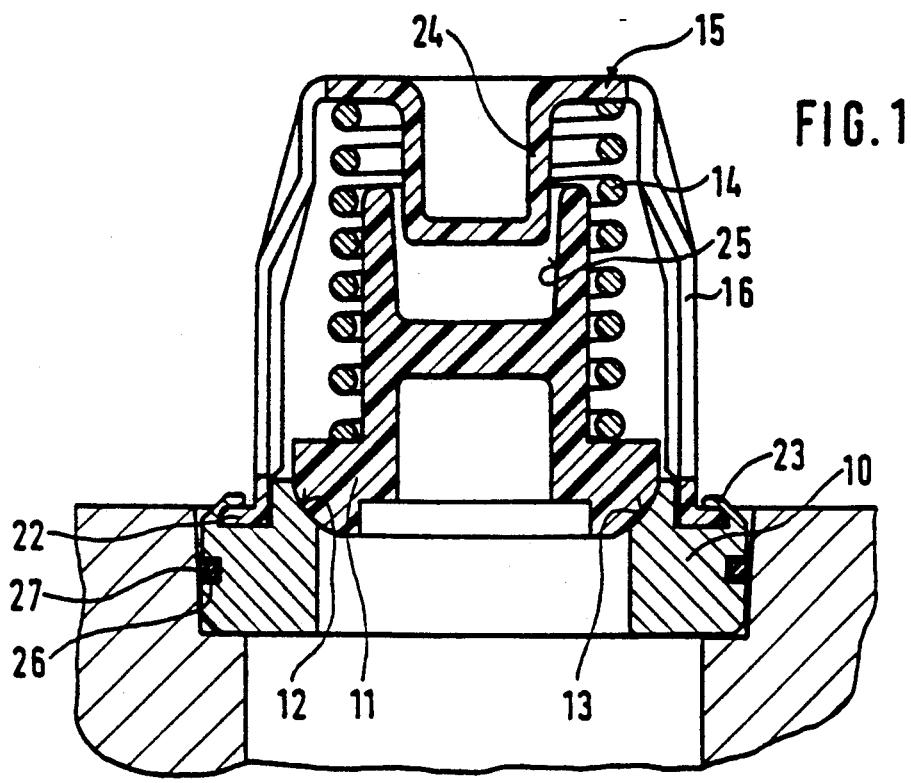
FIG. 1 is a longitudinal section taken through a by-pass valve according to the invention.

The valve of FIG. 1 comprises a valve body 10, which is made for example of an aluminum material, and a valve plate 11, which rests on a conical valve surface 12 of the valve body 10. Valve plate 11 has a valve surface 13 which is slightly rounded, so that slight differences in the dimensions of the two valve surfaces will not have any adverse effect on sealing. The valve is held in the closed state by a valve spring 14. This valve spring is a compression spring having one end which lies against the valve plate 11. The other end of the spring 14 pushes against a valve hood 15.

Figure 2:
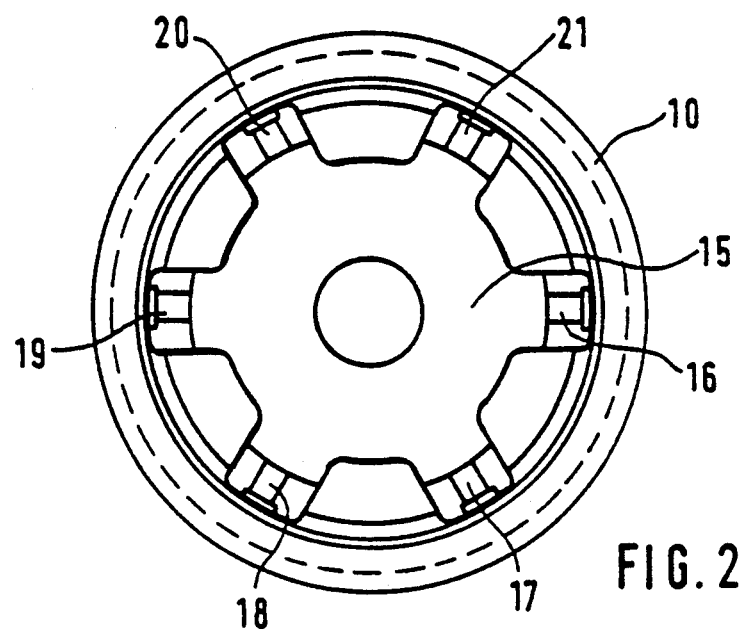
FIG. 2 is a top view of the valve shown in FIG. 1.

The valve hood 15 is made of plastic and, as can be seen particularly in FIG. 2, it is in the shape of a crown, i.e., it has six T-shaped connecting spokes or legs. These spokes have inner surfaces which define an inside diameter and serve to radially guide the valve plate 11 in the lower part of the crown. These spokes are connected together at the bottom of the hood to form an annular flange 22, which is inserted into a mating recess in the valve body 10 and is held in place by bending the margin 23 of the valve body 10 down over the flange 22.

A cylindrical cup 24 is provided at the top the valve hood 15. This cylindrical cup 24 is received in a cooperating bore 25 in the valve plate 11 such that the valve plate 11 is radially guided by cup 24. At the same time the cup and bore also form a lower stop for the axial movement of the valve plate.

To reduce its weight, valve plate 11 is also provided with a bore on its side facing the valve seat, and like the valve hood, it is made of injection-molded plastic.

A groove 26 is formed on the outer circumference of valve body 10. An O-ring 27 is inserted into this groove so that the valve can be disposed sealingly in the bore of an oil passage. The valve may be fixed in place by a suitable clamping means, such as a lock ring or the like.

The strength of the spring is determined by the desired opening pressure. By appropriately selecting the valve spring, the valve can be used for any desired opening pressures.

Figure 3:
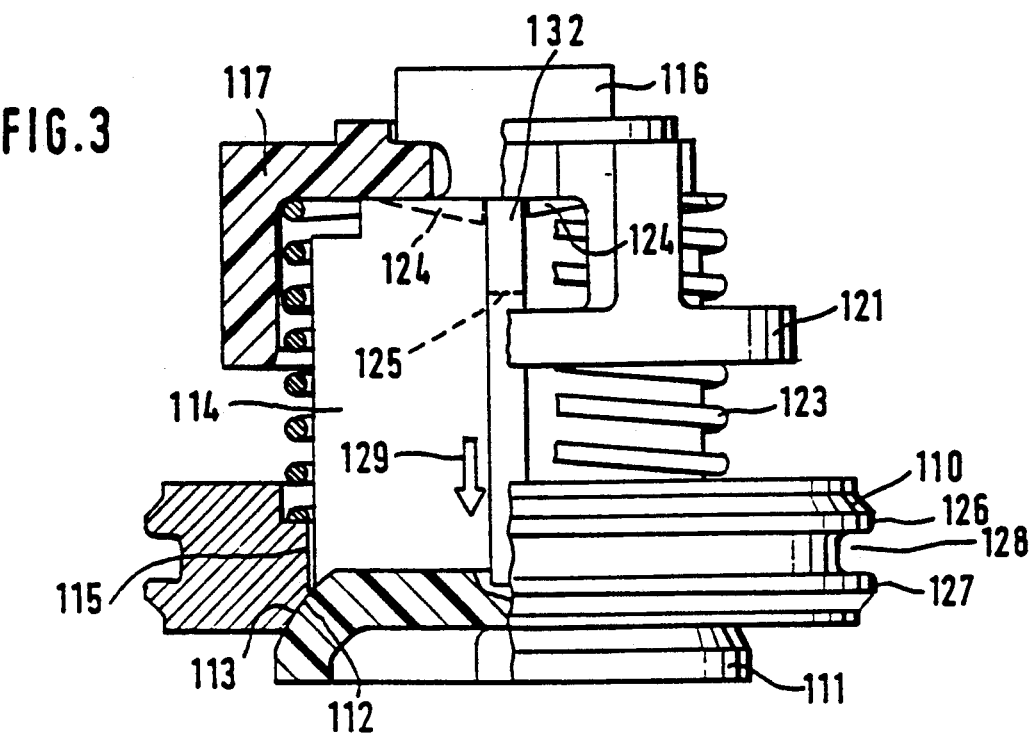
FIG. 3 is a partial cross section through another valve embodiment according to the invention.
Figure 4:
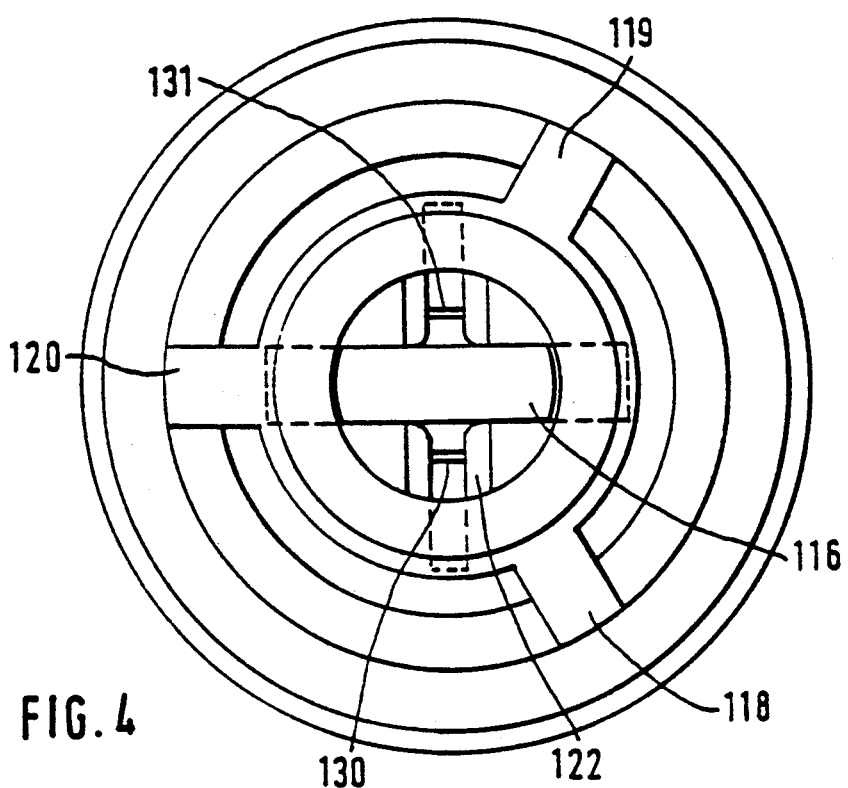
FIG. 4 is a top view of the valve shown in FIG. 3.

The valve of FIG. 3 comprises a valve body 110, which is made, for example, of aluminum, and a valve plate 111 which has a rounded (spherical) valve seat 112 in contact with a conical valve seat surface 113 on valve body 110. The valve plate 111 has four guide ribs 114 in a star arrangement, which are shown partly in broken lines in FIG. 4. The outside diameter of the guide ribs 114 is slightly smaller than the diameter of bore 115 of the valve body 110, so that the guide ribs 114 in cooperation with bore 115 form an axial guide for the valve plate. The upper end of the guide ribs 114 is provided with a T-shaped projection 116 which serves to attach an end plate 117.

End plate 117 has three arms 118, 119, 120, distributed around its circumference. These arms are connected to a ring 121 so that a plurality of openings are formed through the end plate. As shown in the top view of FIG. 4, this end plate is provided with a slot 122 through which the T-shaped projection 116 can be extended. When the valve is assembled, the valve plate 111 is inserted from the bottom into the valve body 110. A valve spring 123 is slipped over the guide ribs 114 of the valve plate from the opposite side, and then the end plate 117 is guided with its slot 122 over the projection 116. After the end plate is in the axial end position, it is locked by rotating it 90° so that slot 122 is at right angles to T-shaped projection 116.

To fix the end plate 117 in this position, inclined catch surfaces 124 are provided on the bottom of the end plate, between which the upper portion 132 of two oppositely disposed guide ribs 114 is caught. The upper portion 132 of these guide ribs 114 is constructed so as to be resilient; that is, these guiding ribs are separated from the central core of the guide ribs 114 by longitudinal slots 130 and 131 which extend down to the broken line 125.

On the outside diameter of the valve body 110 are two annular beads 126 and 127. The configuration of beads 126 and 127 makes it possible to force valve body 110 into a bore of corresponding dimensions. To seal the bore an O-ring can be inserted into the groove 128 between the beads.

The direction in which the liquid flows through the valve is shown by the arrow 129. The valve is normally closed, and when used in a pressure lubrication filter as a pressure relief valve (i.e. when the oil pressure in the filter exceeds a certain value), the valve plate 111 will be moved downward by the excess pressure and will open the passage between the valve surfaces 112 and 113. This movement is limited by the ring 121 which stops against the valve body 110 when the valve is fully opened.

Figure 5:
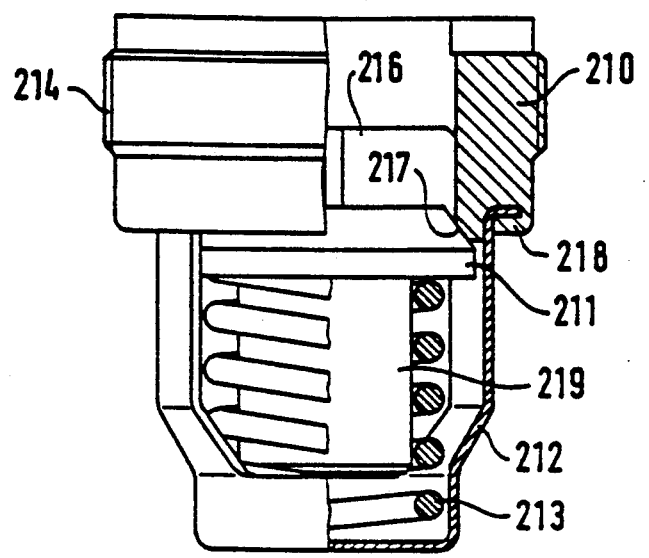
FIG. 5 is a longitudinal section through an additional bypass valve embodiment according to the invention.

The valve according to FIG. 5 comprises a valve body 210 made, for example, of aluminum, and a valve plate 211 which is arranged in the valve body and is provided with a frustoconical valve seat 217 in contact with a mating opposing surface on valve body 210. Under the influence of a valve spring 213, the valve plate 211 closes the passage through the valve body 210.

The valve spring 213 rests against a valve hood 212, which is provided with openings on both sides and is formed, for example, of a corrosion-resistant steel sheet. To secure the valve hood 212, the hood has two flanges at its ends facing the valve body 210. These flanges are crimped underneath a bead margin 218 of the valve body 210 in order to fasten the valve hood 212 onto the valve body 210.

Figure 6:
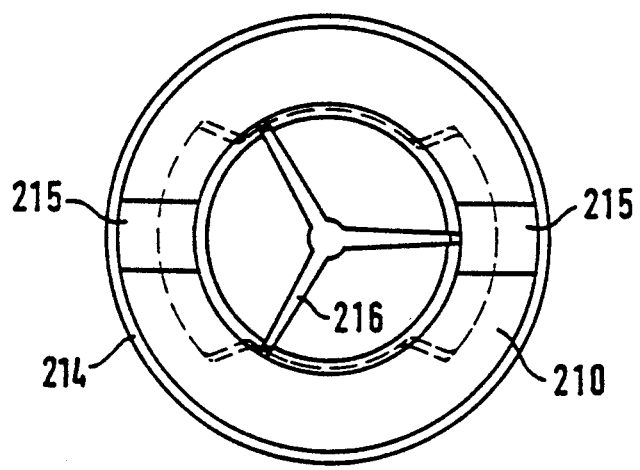
FIG. 6 is a top view of the valve shown in FIG. 5.

To support the valve plate 211 in the valve body 210, the valve body is provided with guides 216. As can be seen in FIG. 6, these guides have a star-shaped configuration and fix the valve plate in a central position with respect to the valve body. A screw thread 214 is provided on the outer circumference of valve body 210. By means of this thread the valve body can be screwed into a lubricating oil bypass channel. Slots 215 are provided on the valve body 210 to facilitate screwing the valve in and out. Instead of these slots the valve body could alternatively be provided with other engagement means for a driving tool for screwing the valve in or out.

The valve plate furthermore comprises a projection 219. This serves on the one hand as a guide for the valve spring 213, and on the other hand—in conjunction with the valve hood 212—as a stop to prevent the valve from opening too far at high oil pressures. The valve spring 213 is of such a size that the valve will open at a pressure of about 2.2 bar. It is possible, of course, to provide for any desired opening pressure by appropriate selection of the valve spring.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A valve comprising a cylindrical valve body having a valve opening therethrough, a valve plate having a valve seat thereon cooperating with said valve body to close said valve opening, a valve hood secured to said valve body enclosing said valve plate, and a spring disposed between said valve hood and said valve plate for urging said valve plate against said valve body to seal said valve opening; wherein said valve body has at an end facing said valve seat a bead margin under which a flange on said valve hood is crimped to secure said valve hood to said valve body; wherein said valve seat comprises a frustoconical surface which contacts a corresponding frustoconical surface of a central bore which defines said valve opening in said valve body; wherein a screw thread is arranged circumferentially around said cylindrical valve body for securing said valve body in a fluid passageway, and wherein said valve plate is provided with at least three guide surfaces which have radial lengths smaller than the radius of said bore and which are received in said bore for guiding said valve plate.

2. A valve according to claim 1, wherein said valve is a pressure relief valve for a pressure lubrication oil filter of an internal combustion engine.

3. A valve according to claim 1, wherein a tool receiving recess for a corresponding mounting tool is provided on said valve body opposite said crimped margin.

4. A valve according to claim 1, wherein said guiding surfaces are arranged in a star-configuration.

5. A valve according to claim 4, wherein said valve hood consists of a strip of sheet metal and covers only a portion of the circumference of said valve body.

* * * * *